United States Patent [19]

Vicino

[11] Patent Number: 4,799,982

[45] Date of Patent: Jan. 24, 1989

[54] METHOD OF MOLDING MONOLITHIC BUILDING STRUCTURE

[75] Inventor: Robert K. Vicino, San Diego, Calif.

[73] Assignee: Charmasson & Holz, San Diego, Calif. ; a part interest

[21] Appl. No.: 129,466

[22] Filed: Dec. 7, 1987

Related U.S. Application Data

[63] Continuation-in-part of Ser. No. 841,946, Mar. 20, 1986, abandoned.

[51] Int. Cl.[4] .......................... B28B 5/04; B28B 7/32; B32B 5/18; E04B 1/16

[52] U.S. Cl. ........................................... 156/71; 52/2; 52/741; 156/79; 249/27; 249/65; 249/83; 249/153; 249/171; 249/177; 249/185; 264/32; 264/35; 264/45.2; 264/46.5; 264/251; 264/253; 264/256; 264/314; 425/112; 425/129.1; 425/470

[58] Field of Search ................... 264/32, 35, 314, 333, 264/45.2, 46.5, 251, 253, 256; 425/470, 129.1, 112; 52/659, 315, 2 A-2 H, 2 J-2 N, 2 P, 2 R, 390, 741, 309.11, 309.12; 156/71, 79

[56] References Cited

U.S. PATENT DOCUMENTS

| | | | |
|---|---|---|---|
| 2,485,898 | 10/1949 | Mathews et al. | 249/65 |
| 2,978,779 | 4/1961 | Tatsch | 249/27 |
| 3,292,338 | 12/1966 | MacClarence et al. | 264/32 |
| 3,440,787 | 4/1969 | Bataille | 52/390 |
| 3,462,521 | 8/1969 | Bini | 264/32 |
| 3,579,941 | 5/1971 | Tibbals | 52/390 |
| 3,643,910 | 2/1972 | Heifetz | 264/32 |
| 3,742,102 | 6/1973 | Stickler, Jr. | 249/27 |
| 3,831,898 | 8/1974 | Sachs | 249/179 X |
| 3,923,436 | 12/1975 | Lewis | 264/32 |
| 3,942,753 | 3/1976 | Sachs | 249/65 |
| 3,959,423 | 5/1976 | Boyd | 264/35 |
| 4,060,218 | 11/1977 | Nayagam | 249/65 |
| 4,102,956 | 7/1978 | Heifetz | 52/2 |
| 4,119,695 | 10/1978 | Asserback | 249/179 X |
| 4,180,233 | 12/1979 | Johnson | 249/27 |
| 4,186,165 | 1/1980 | Aberson et al. | 264/128 X |
| 4,258,098 | 3/1981 | Bondoc et al. | 264/128 X |
| 4,426,060 | 1/1984 | Csont | 249/185 |
| 4,442,059 | 4/1984 | Boyce | 264/32 |
| 4,606,878 | 8/1986 | Day et al. | 264/333 |
| 4,678,157 | 7/1987 | Fondiller | 264/314 X |

*Primary Examiner*—Jan H. Silbaugh
*Assistant Examiner*—Karen D. Kutach
*Attorney, Agent, or Firm*—Charmasson & Holz

[57] ABSTRACT

Methods of manufacturing a modular, monolithic, integrated, multi-layered, mold building structure including the steps of constructing a dismantleable mold having an outer rigid matrix and an inner inflatable plug, wherein the inside dimensions of the matrix correspond to the outside dimensions of the structure and the outside dimensions of the plug correspond to the inside dimensions of the structure, placing high strength fibers between the plug and the matrix, injecting hardenable material between the matrix and the plug, curing the hardenable material into a hard shell, removing the matrix, deflating the plug, and installing walls, doors or windows. The structures may be joined together on-site in various combinations and configurations to create different types and styles of buildings.

19 Claims, 12 Drawing Sheets

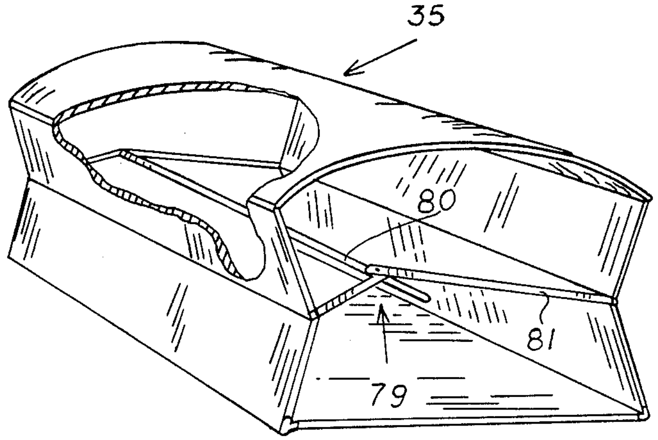
FIG. 26
FIG. 30
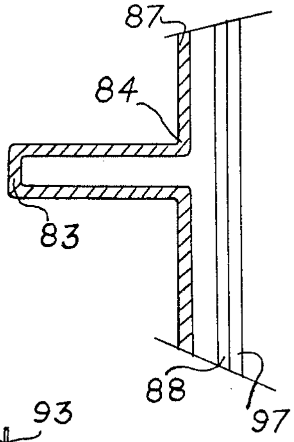
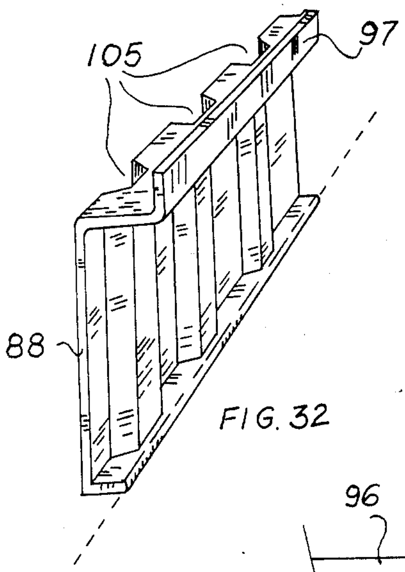
FIG. 32
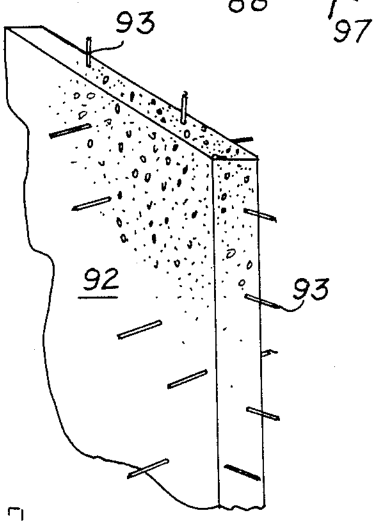
FIG. 31
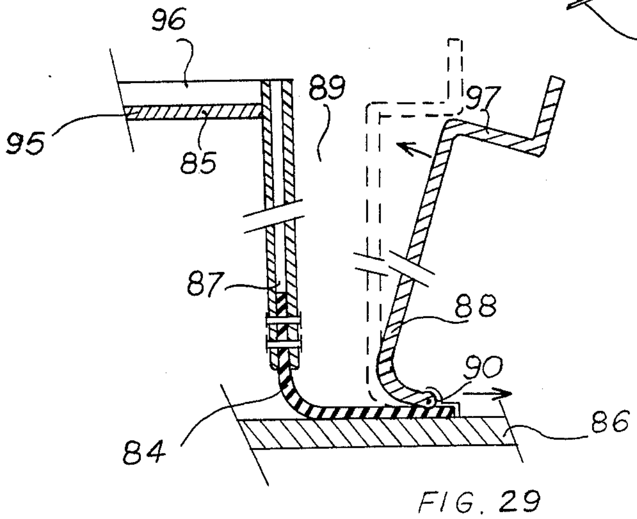
FIG. 29

METHOD OF MOLDING MONOLITHIC BUILDING STRUCTURE

This is a continuation-in-part of application Ser. No. 06/841,946, filed on Mar. 20, 1986, now abandoned.

FIELD OF THE INVENTION

The invention relates to a method of manufacturing a monolithic molded building module, and more specifically to utilizing an air-inflated form over which structural shells would be formed. This invention also relates to the method of forming structural shells.

BACKGROUND OF THE INVENTION

The art of prefabricated building structures is not new, but it has always been predicated upon a difficult compromise between cost and quality. Even today the state of the art in pre-cast housing modules is still not perceived to yield high enough solidness and durability.

The main problem has always been the high cost of manufacturing, assembling and finishing the building structures, namely the labor, material, construction time and management costs.

The high manufacturing cost is due to labor intensive methods, material waste, and expensive raw material. Furthermore, the methods of the prior art resort to thousands of parts and pieces to be assembled, handled, designed and inventoried. These efforts require an excessive number of highly trained and specialized technicians.

Other disadvantages of the conventional manufactured building units are their structural deficiency and short life expectancy which is about fifty years. During its life span, the conventional structure may require major refurbishing and maintenance. The conventional manufactured building methods require the installation of a floor foundation on the building site, prior to erecting the prefabricated or manufactured structure. The separate installation of the floor foundation necessitates the mobilization and relocation of highly trained and specialized labor and of complex and bulky machinery to the construction site.

Even the most advanced manufacturing methods require a substantial length of time for installing and finishing the structure on site. This extended construction time is translated into higher cost.

The existing technology allows the superimposition or stackability of a very limited number of stories.

The maintenance and modification of electrical wiring, mechanical and plumbing utilities in existing manufactured structures involve elaborate efforts.

The manufactured structures of the prior art do not possess a great tolerance to the natural elements, wind, water, temperature, sun and fire. The existing manufactured structures comprise numerous energy leaks through cracks, seams, joints due to the use of a large number of components, which render the building module less energy efficient.

Wherefore, there is a basic need for a structure and method which solve the above-mentioned problems.

SUMMARY OF THE INVENTION

The above-stated need is met by the present invention, wherein the principal object is to reduce the labor and material costs.

Another object of the invention is to substantially reduce the number of parts and pieces to be assembled, handled, designed and inventoried at the factory or on site.

Another object of the present invention is to improve the structural qualities of the building module, thereby increasing its life expectancy, and minimizing maintenance costs.

Yet another object of the present invention is to provide a structure which permits a wide variety of customized architectural styling.

It is also an object of the present invention to provide the structure with an integral floor foundation or slab.

Another object is to enable the installation of prefabricated structural building complexes in a short period of time.

It is also another object of the invention to enable the superimposition of several levels of prefabricated structures.

Another object is to provide a concealed sub-floor chase for electrical wiring, mechanical and plumbing utilities.

A secondary object of the present invention is to provide the manufactured structure with a great tolerance to the natural elements, wind, water, temperature, sun and fire.

Another secondary object is to improve the energy efficiency of the structure by eliminating, or reducing energy leaks through cracks, seams, joints between contiguous members.

Yet another object of the invention is to provide integrated, double arched, interlocking modules.

These and other objects are achieved by a process which employs an inflatable jointed panel plug to form the interior surface of a mold and reinforced casting materials. The inflatable plug uses hinged structural members to produce straight walls and allow withdrawal after production of cast structure. Other process steps provide insulation, utilities, portals, coatings and interlocking features.

The object of reduced cost and assembly time is achieved by the reusable structure plug instead of conventional techniques or elastomeric plugs. Improved structural quality and energy efficiency are achieved by the reinforced material and integral construction. Structural plugs can be easily modified to achieve customized styling, stackability or improved tolerance of the elements.

BRIEF DESCRIPTION OF THE DRAWINGS

FIG. 26 is a diagrammatical illustration of the plug folding mechanism;

FIG. 29 is a partial cross-sectional view illustrating the operation of the tilt-up matrix;

FIG. 30 is a diagrammatical illustration of top plan view of an interior wall as enclosed by the tilt-up matrix;

FIG. 31 shows an insulation panel with protruding pins;

FIG. 32 is a perspective view of a portion of the tilt-up matrix;

FIG. 35 is a perspective view of the inflatable plug being sprayed on;

DESCRIPTION OF THE PREFERRED EMBODIMENT OF THE INVENTION

The manufacturing process for the molded building structure could take place in one stationary location or the module could be processed in different stations along an assembly line. The preferred embodiment comprises the steps of moving the module through different stations, for a more efficient mass production, as described below.

Figure 1:
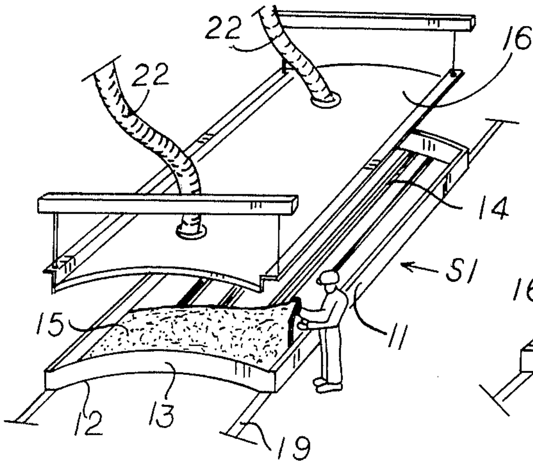
FIG. 1 shows the step of forming the sole.

As shown in FIG. 1, the slab (18 in FIG. 4) is formed at a first station S1, by installing a floor pan 11 having a convex bottom 12 and four upright side walls 13 over the mechanized assembly rails or tracks 19. Beams 14 could optionally be included in the pan 11 if additional strength is needed. Mats 15 of loosely packed filiform reinforcing elements such as steel pins are placed inside the pan 11. The method of manufacturing the steel fiber mats 15 will be detailed later in this disclosure.

A cover form 16 is automatically lowered on top of the pan 11 to define the upper shape and form a lid. A cementitious slurry is then injected or poured thorugh hoses 22, inside the pan 11. The pan 11 could alternatively be filled with a cementitious slurry from the bottom 12. In either case, the pan 11 may be continuously vibrated during the filling or injection process, to insure the smooth flow of the cement fill, and to remove air bubbles. The vibration process may be done once the pan 11 is filled with the cementitious slurry.

Figure 2:
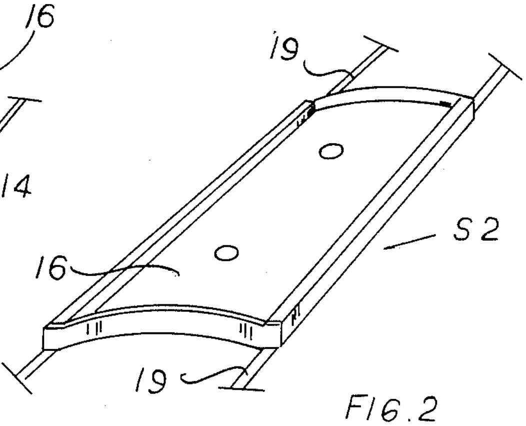
FIG. 2 shows the step of curing the sole.

The floor pan 11 is moved along the tracks 19 to station S2 shown in FIG. 2, and the cementitious slurry is left to cure and dry. Once the curing process is complete, the cover form 16 is removed.

Figure 3:
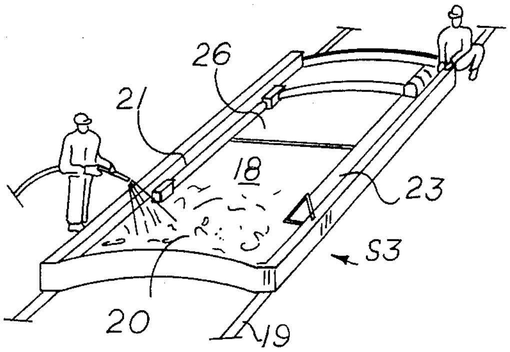
FIG. 3 shows the steps of insulating the sole and installing the conduits for electrical wiring and utility fixtures, and heating and ventilating ducts.

As shown in FIG. 3, electrical, mechanical and other utility conduits 21 and air conditioning ducts 23 are then installed within the sub-floor chase 26 as needed. The chase 26 is then optionally filled with foam or other insulation material 20. The installation of the utility conduits is accomplished in station S3 along the tracks 19.

Figure 4:
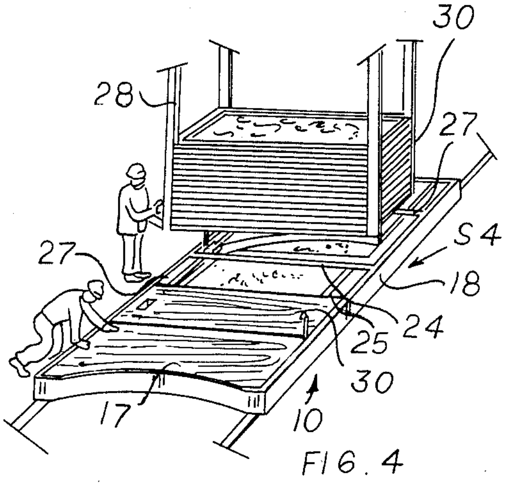
FIG. 4 shows the steps of installing floor joists and floor sheeting.

The next step in the formation of the sole (10 in FIG. 5) is the installation of the parquet 17 as shown in FIG. 4. To achieve this purpose, the slab 18 is moved to station S4 where joists 24 and crossbeam 25 made out of rigid material, preferably wood or metal, are installed atop the slab 18 into aligning slots 27. The parquet 17 is then built atop the joists 24 by automatically nailing plywood sheets 30 to the joists 24 by means of a nailing machine 28.

Figure 5:
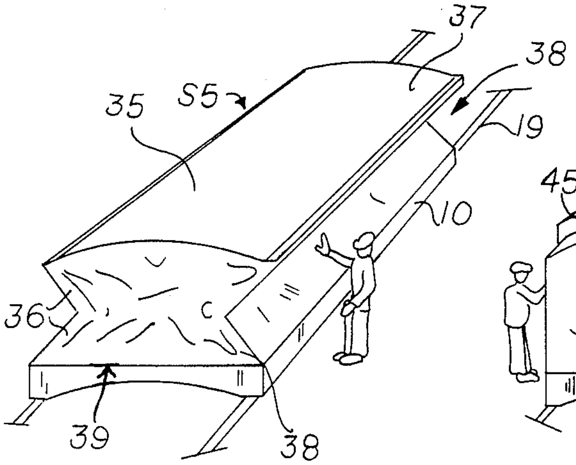
FIG. 5 shows the step of placing and inflating the inflatable plug atop the sole.

The next step is illustrated in FIG. 5. The sole 10 is moved along the tracks 19 to station S5, where an inflatable plug 35 is positioned atop the parquet 17. The plug 35 is expanded and inflated by means of pressurized fluid, preferably air, and its expanded outer size, dimensions and texture are commensurate with the inner size, dimensions and texture of the desired building structure.

Figure 13:
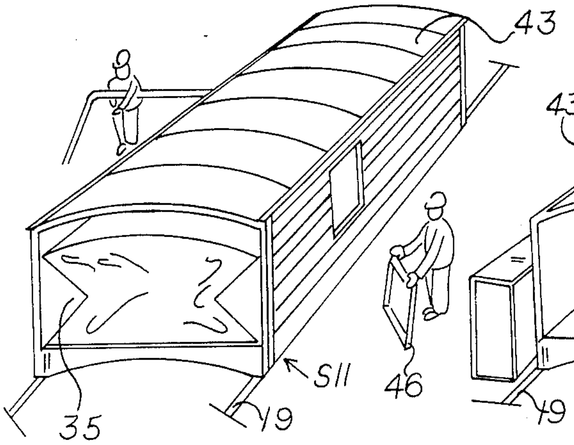
FIG. 13 shows the steps of removing the inflatable plug, end collars and blockouts.
Figure 25:
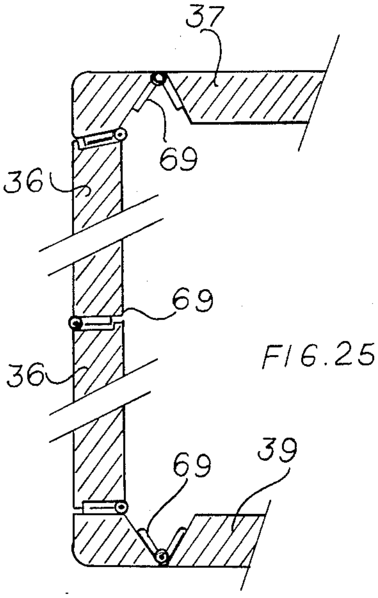
FIG. 25 illustrates the hinging of the plug lateral wall elements.

The inflatable plug 35, also illustrated in FIGS. 25 and 13, generally comprises an envelope made of rigid, foldable sections such as two collapsible lateral walls 36, one top 37, two end walls 38 and one bottom panel 39. The bottom panel 39 has dimensions which match those of the parquet 17. Each lateral wall comprises two half panels hinged together and along their upper and lower edges to the top 37 and bottom panel 39 respectively.

The walls 36 and the top 37 are made out of light but rigid material, preferably aluminum or steel sheeting over a stiffening or reinforcing framework and could optionally be covered with a smooth pliable material such as plastic, in order to provide a seamless and textured surface. The end walls 38 are made out of flexible material such as heavy coated fabric, vinyl coated nylon or dacron.

Figure 6:
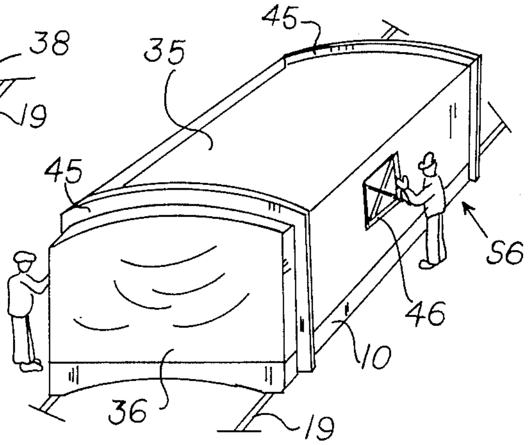
FIG. 6 shows the steps of installing window blockouts and end-collars.

Once the plug 35 is inflated, two or more end collars 45 may optionally be installed around the plug 35 at different variable distances, as shown in FIG. 6, at station S6. The spacing between the end collars 45 determines the length of the module. Window and door forming blockouts 46 are then optionally attached to the plug 35. These blockouts 46 could be permanently attached to plug 35 or in the alternative, they could be held by imbedded magnets or by suction cups against the metallic surface of the walls 36. The magnets or suction devices (not shown in FIG. 6) could be positioned within or on the face of the blockouts 46 or the walls 36.

Figure 7:
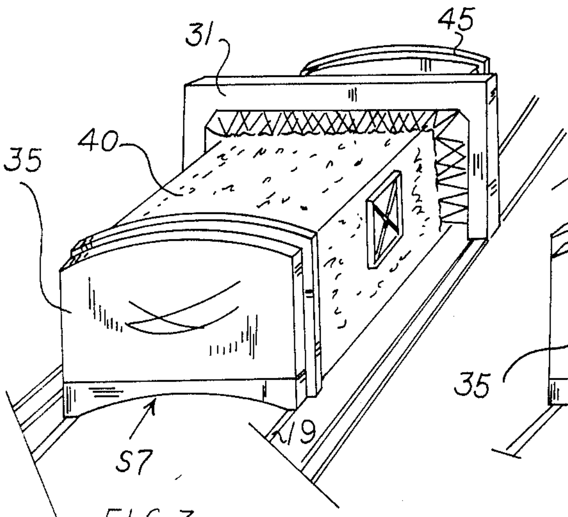
FIG. 7 shows the step of spraying a gypsum layer.

Once the blockouts 46 are installed, the structure is moved along the tracks 19 to the next station S7, as illustrated in FIG. 7, where the plug 35 is sprayed with a gypsum layer 40. The spraying process could optionally be accomplished by passing the structure through a carwash-like apparatus 31, which sprays the plug 35 between the determined end collars 45 in one or more passes. Alternatively, the apparatus 31 could be fixed and the plug 35 is made to pass under it. The gypsum layer 40 is then cured until it dries sufficiently at station S8.

Figure 8:
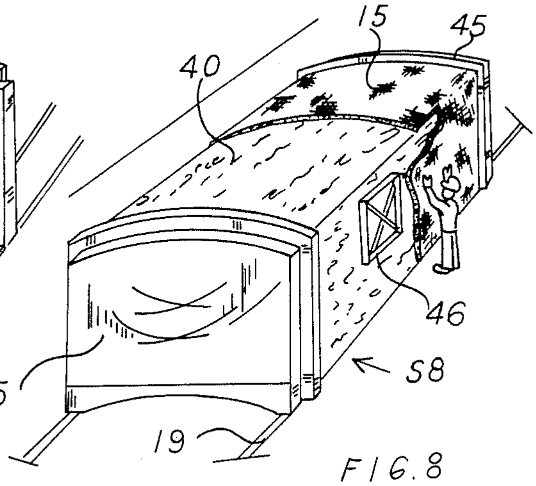
FIG. 8 shows the gypsum layer covered with a layer of steel pin mats.
Figure 9:
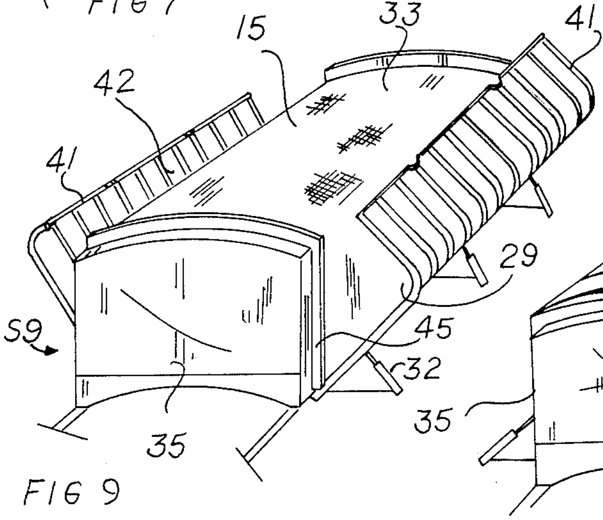
FIG. 9 shows the step of enclosing the pin mat surface with a tilt-up matrix.
Figure 21:
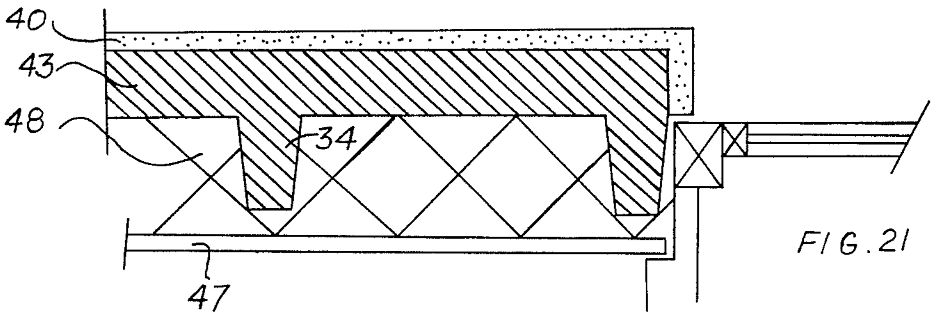
FIG. 21 is a partial cross sectional view taken along line 21—21 of FIG. 20.
Figure 22:
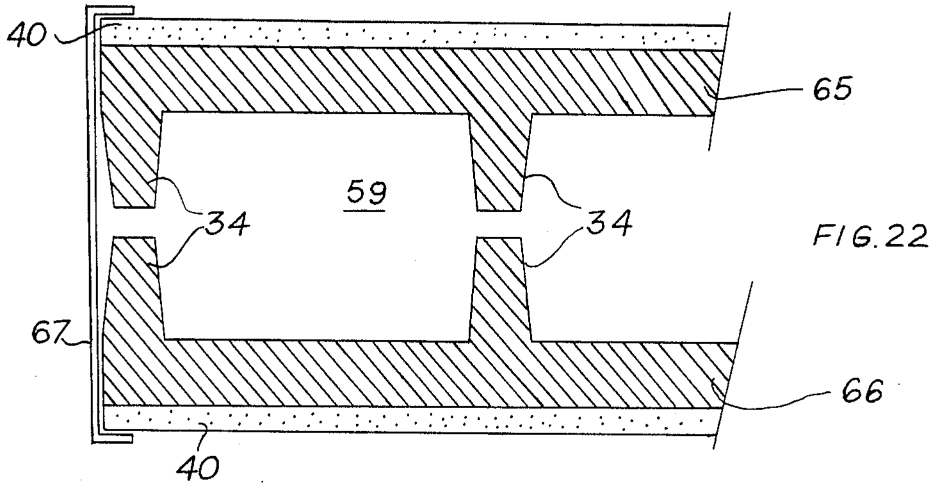
FIG. 22 is a partial cross sectional view of adjacent walls connected by means of a wall end-cap.

FIG. 8 illustrates the step of covering the gypsum layer 40 with mats of loosely packed filiform reinforcing elements such as steel pin mats 15 at station S8. The mats are dimensioned to fill the space unoccupied by the blockouts on the outer surface of the plug. When more than one steel pin mat 15 is used, the adjacent mats 15 are closely interlocked, bonded and possibly stapled together, to avoid a "cold joint" and to provide a strong seamless structured, fiberous skeleton 33 as shown in FIG. 9. This skeleton 33 could also be shaped so as to form beams 34 equidistally designed and located to increase the lateral and vertical load bearing capability and strength of the structure, as shown in FIGS. 21 and 22. FIG. 21 provides details of the beams 34, which may be varied in their profile and/or spacing.

Figure 10:
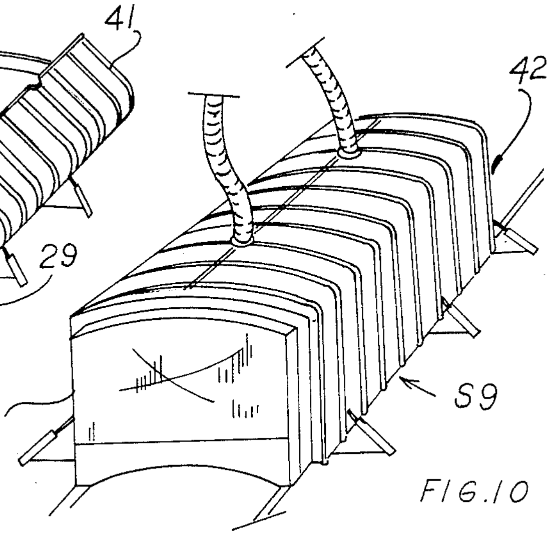
FIG. 10 shows the step of filling or injecting a cementitious slurry between the tilt-up panels and into the pin mats.

FIGS. 9 and 10 illustrate the method of forming the structured shell at station S9. An outer rigid matrix 42 is formed by assembling a plurality of generally vertical panels or walls 41 having projecting sections extending from the top edges toward each other over the top of the plug 35. The vertical panels 41 are hydraulically tilted by cylinder 32 up to cover the work between the two end collars 45 and to form the outer rigid matrix 42 enclosing a fiberous cavity. The inner surface of the matrix 42 corresponds to the outside dimensions and shape of the module.

In the alternative, the step of covering the gypsum layer 40 with steel pin mats 15 could be done by lining outer matrix 42 with pin mats, before tilting the panels 41 up around the structure; or by injecting loose pins into the cavity 29 created between the matrix 42 and the gypsum layer 40 once the panels 41 are in place.

Figure 12:
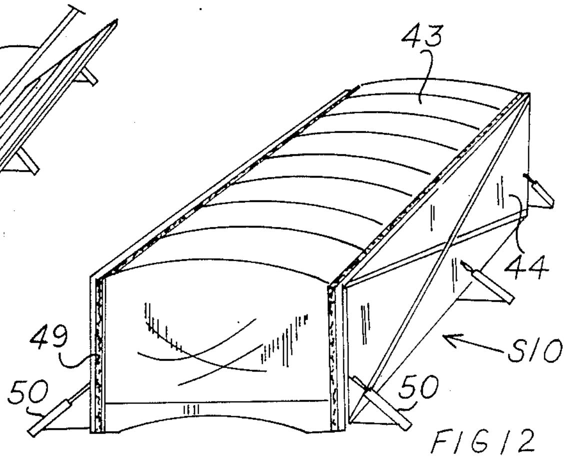
FIG. 12 shows the tilted up outer walls creating a cavity between the dried outer membrane and the dried structural shell, into which insulation material has been injected, creating an insulation membrane and automatically glueing the two membranes together.

The next step as illustrated in FIG. 10, consists in injecting a hardenable material such as a cementitious slurry between the matrix 42 and the plug 35 to fill the cavity 29 occupied by the mats 15, to form a hard shell 43 shown in FIG. 12. THe hard shell 43 is then cured until sufficiently dried.

Figure 11:
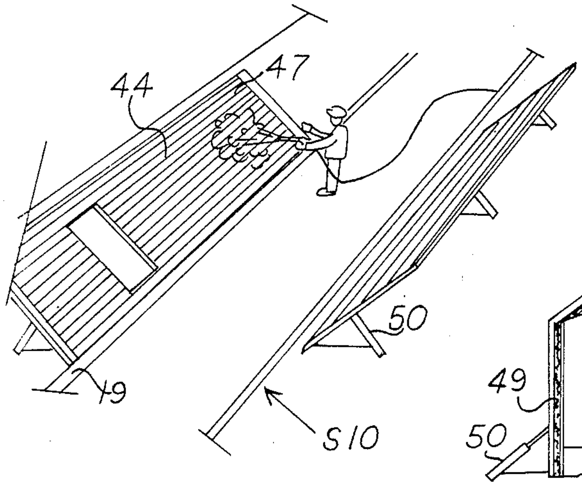
FIG. 11 shows the step of coating the outer wall forms with a textured membrane of stucco, cementitious material or moldable wood.

During this curing process, at the next station S10, along the tracks 19 two outer wall forms 44 are lined with a coating 47 of hardenable material such as stucco, cement or moldable wood forming an exterior membrane for the molded building structure, as shown in FIG. 11.

Once sufficient curing has taken place, the outer wall forms 44 are hydraulically or mechanically tilted up at a variable distance from the hard shell 43 by cylinders 50, as shown in FIG. 12 to sandwich the hard shell 43, which has already been moved forward from it previous station S9 after drying. Foam 49 is then injected between the hard shell 43 and the outer wall forms 44, to form an insulation membrane, and to bond the coating 47 to the hard shell 43, and the outer wall forms 44 are removed.

The next step is illustrated in FIG. 13. At station S11, the inflatable plug 35 is "unlocked" then gradually deflated and removed from the hardened structure. In order to prevent the plug 35 from adhering to the inside of the structure, thereby posing difficulty in separating the two surfaces apart and in removing the plug 35, air nozzles installed inside the inflated plug 35 (not shown in FIG. 13) burst a sequence of pressurized air, causing the separation of the two surfaces. The outer wall forms 44, end collars 45 and blockouts 46 are then removed.

Figure 14:
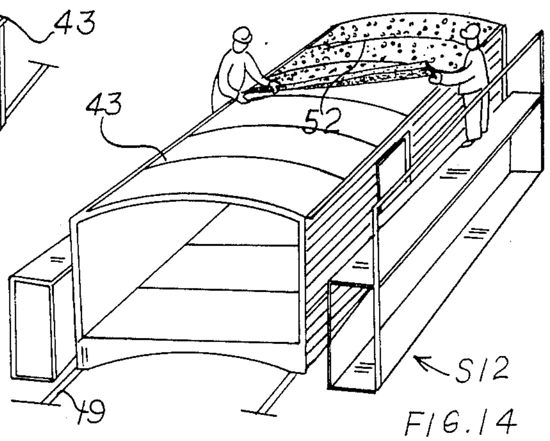
FIG. 14 shows the step of installing foam panels for insulating the roof.
Figure 15:
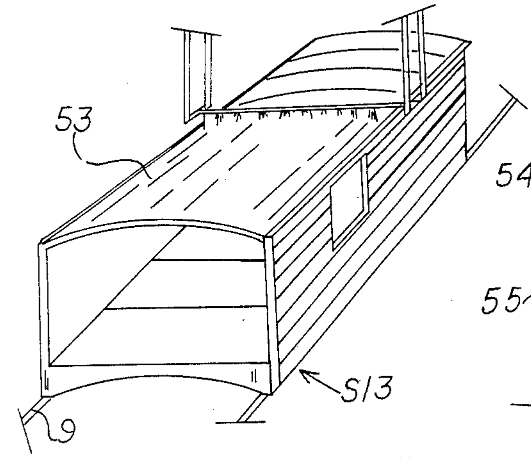
FIG. 15 shows the step of spraying the roof foam material with an ultra-violet shielding and waterproofing coating.
Figure 16:
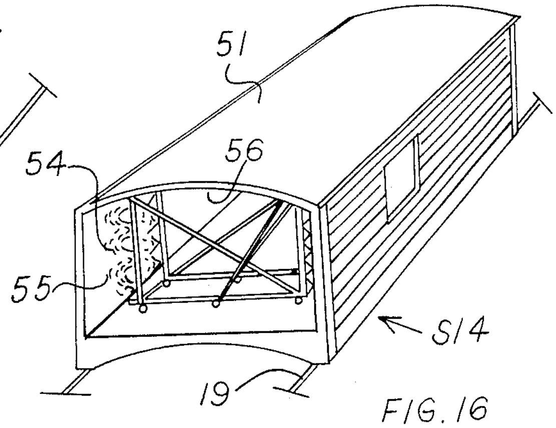
FIG. 16 shows the step of automatically painting the interior walls and ceiling.

The roof 51 can be optionally insulated by glueing in place pre-extruded styrene panels 52, and sprayed or coated with an ultraviolet and waterproofing coating 53 as illustrated in FIGS. 14 and 15. The installation of the panels 52 is completed in station S12, and the spraying is completed at station S13.

The structure is then moved along the tracks 19 to a new position S14. The interior walls 55 and ceiling 56 are then sprayed with interior paint 54.

Figure 17:
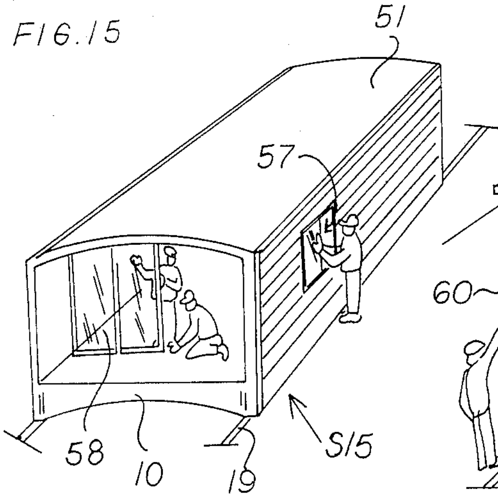
FIG. 17 shows the step of installing exterior doors and windows.
Figure 18:
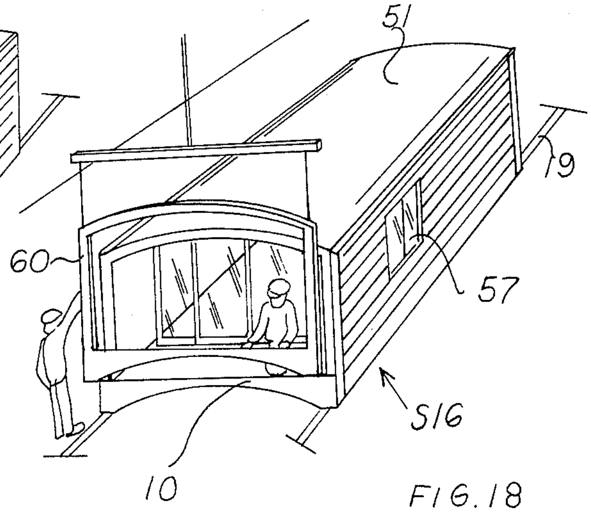
FIG. 18 shows the step of installing end walls.
Figure 20:
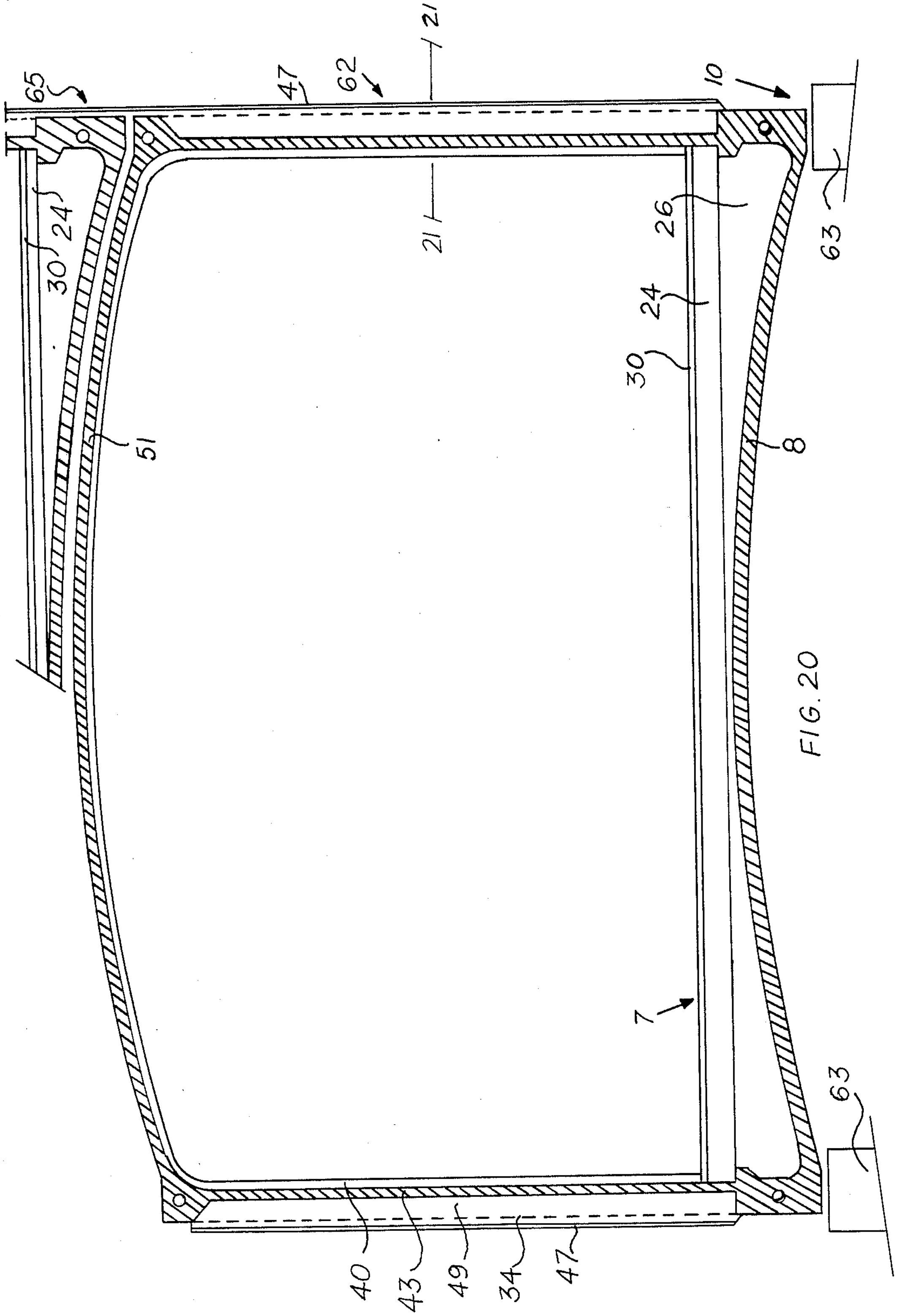
FIG. 20 is an elevational cross sectional view of a basic modular unit.

Next, the structure is successively moved to stations S15 and S16, as shown in FIGS. 17 and 18, where windows 57, doors 58 and end panels or walls 60 are installed as optionally necessary. As shown in FIG. 20, the optional convex roof 51 and floor slab 18 are so designed for at least two purposes. The first is to increase the compressive load-bearing capacity, and the second is to enable the superposition or stacking of several structures, interlocking with one another.

FIG. 20 shows the stackability feature of the structure. The first structure 62 is laid on a strip, pier or full foundaton 63 within the earth according to the soil conditions and local building code. The second structure 65 (illustrated only partially on the right of the drawing) is in turn laid on top of the arched roof 51 of the first structure 62 with the lower outer corners resting on the upper outer corners of the lower structure. The two structures 62 and 65 are then tightly bolted together or welded as desired. 384

Figure 23:
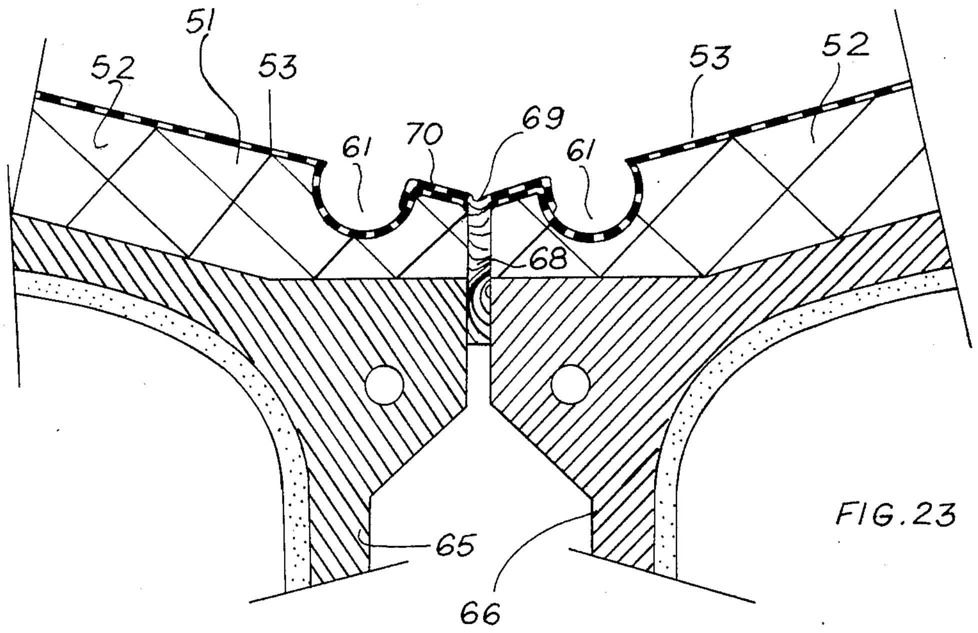
FIG. 23 is a partial cross sectional view of two adjacent roofs.

FIGS. 21, 22 and 23 illustrate how two or more structures could also be modularly positioned and connected side to side, by horizontal bolting or welding. The two adjacent walls 65 and 66 do not necessarily include the insulation foam 49 or exterior coating 47. A chase area 59 is thus provided between the molded beams of this vertical wall for utilities. As shown in FIGS. 22 and 23, the walls 65 and 66 of adjacent structures are seamed together by means of wall end caps 67. Adjacent roofs 51 are connected by means of a filler board 68 which keeps the two structures separated but bridged by a waterproofing skin cap 70 bridging the gutters 61 and a flexible seam 69.

Figure 19:
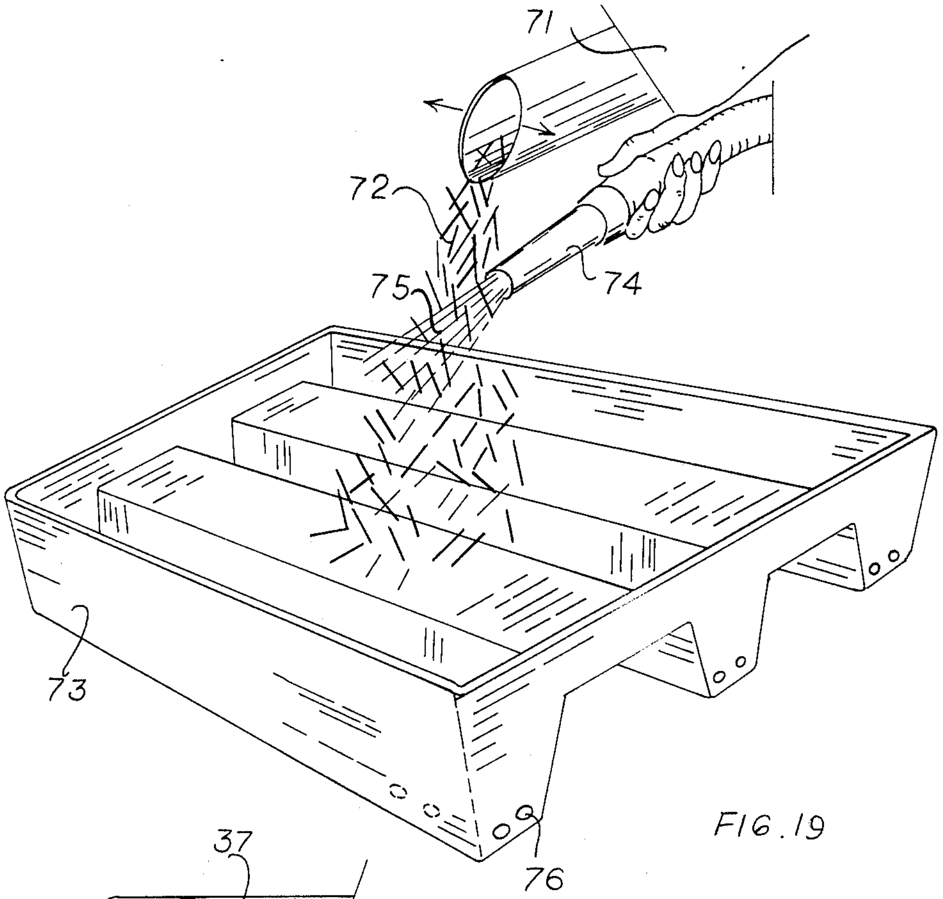
FIG. 19 shows the method of forming the steel pin structural mats.

As shown in FIG. 19 the steel pin mats 15 are formed by first dropping pins 72 from a hopper 71 into a container or form 73 which is shaped to mold flat mats or mats having the protruding shape of the beams 34 or blocks, columns, posts, piers or planks, as desired. The pins 72 (or alternately composite fibers) are randomly dropped or sprinkled.

Pin size and dropping rate determine density and uniformity of the mat. During the dropping process, a bonding material 75 such as glue is sprayed from a nozzle 74, or poured on the pin 72 and excess is drained off through holes 76 on the form 73. The pin agglutinate naturally or are heat dried, to form a mat 15. The most desirable actual volume occupied by the mat itself should be ten percent of the entire volume of the form 73, leaving 90% of the total volume to be filled by the cementitious slurry during construction.

Figure 24:
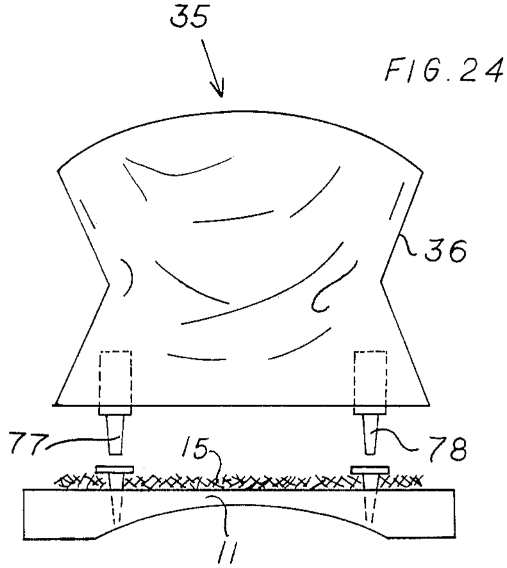
FIG. 24 is a diagrammatical illustration of the secondary embodiments of the plug.

Another method of fabrication would be to form the entire structure as one-piece monolithic shell rather than forming the sole 10 first and then the upper structural shell 43. This could be accomplished as shown in FIG. 24 by installing a pin mat 15 in the floor pan 11, and positioning the inflatable plug 35 atop the mat 64.

In order to hold the plug 35 above the mat 64, lifting cylinders 77 are provided at the bottom of the inflatable plug 35. The cylinders 77 have an adjustable length to raise the plug 35 off the floor assembly pan and the mats 64, and are sheathed in plastic sleeves 78. Blockouts are installed as previously outlined, and a gypsum layer is sprayed onto the plug. The same steps are then followed as with the preferred embodiment to form the structure. When the inflatable plug 35 is to be removed, the lifting cylinders 77 are retracted and the plastic sleeve 78 will remain permanently embedded within the floor slab. These sleeves 78 may become receptacles for attachment of other equipment.

FIG. 25 illustrates the articulations between the various side 36, roof 37 and floor 39 panels of the plug 35 which comprises several hinges 69 located and oriented to allow easy collapsing of the plug panels away from the molded shell. The locking mechanism is illustrated in FIG. 26, and comprises a scissors apparatus 79, with one central steel rod 80 and a plurality of bars 81 symmetrically attached on both sides of the steel rod 80.

When the plug 35 is inflated, the bars 81 are placed into a locking position perpendicular to the rod 80, which will hold the plug 35 in an inflated position.

When the plug 35 is to be deflated, the steel rod 80 is pulled to unlock the scissors apparatus 79 and causes the lateral walls 36 to collapse.

Another embodiment of the manufacturing process would be to form the entire structure including interior partitions, as a one piece monolithic shell.

Figure 27:
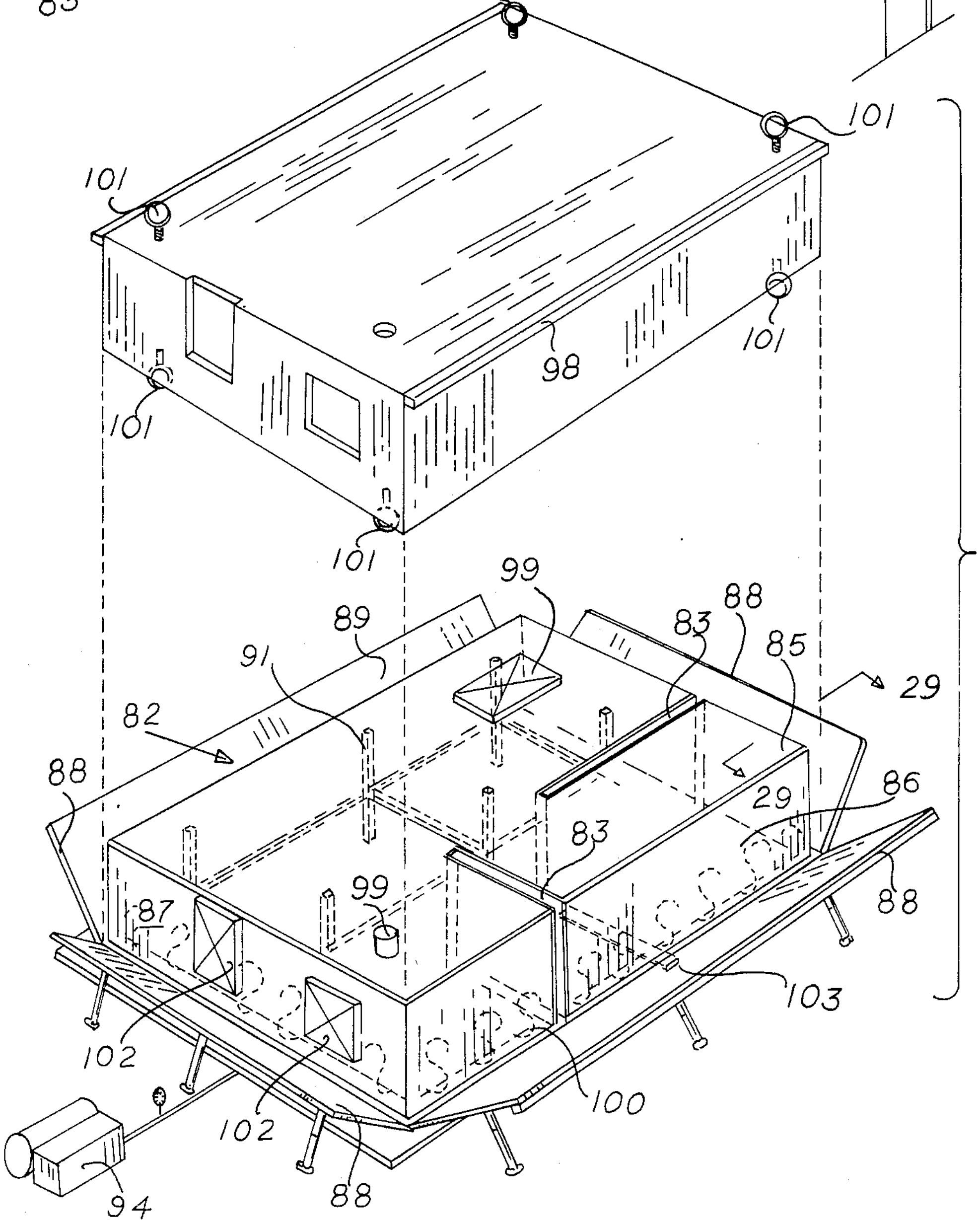
FIG. 27 illustrates the second embodiment of the present invention.

This last embodiment is illustrated in FIGS. 27 through 33. FIG. 27 shows the process of casting the entire structure upside-down. A solid inflatable plug 82 in the form of an air tight box, delineates the inside form of the structure. It comprises four lateral walls 87, the upper lid 85 and a base 86.

The shape of the plug 82 is not limited to the rectangular form as shown in FIG. 27. The plug 82 could be designed to meet wide architectural arrangements, and aesthetic appearances.

The plug 82, and especially the interior walls 83 are preferably formed of heavy duty metal sheets such as steel or aluminum over a frame so as they do not flex or bend.

Figure 28:
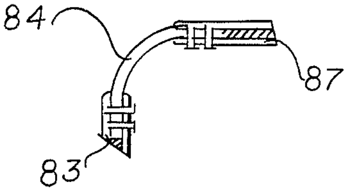
FIG. 28 is a cross-sectional view of the flexible joint connections between the lateral and interior walls of the plug.

A basic feature of the plug 82 is illustrated in FIGS. 28, 29 and 30, namely that the plug 82 is formed of solid sheets that are not in direct physical contact with each other.

FIG. 30 for example, is a top plan view of an interior wall 83.

FIG. 28 is a detailed view of the flexible membrane 84 connection between a lateral wall 87 and an interior wall 83. The solid sheets forming the lateral walls 87, upper lid 85, base 86 and the interior walls 83 are interconnected by flexible membranes 84. Each membrane 84 is sandwiched within the solid sheets, forming the plug 82 and the interior wall 83. The membrane 84 forms a water/air-tight flexible joint.

FIG. 27 also shows four tilt-up forms or vertical panels 88 which form the matrixc panels and which enclose the lateral walls 87, forming a water-tight cavity 89 therewith. When the tilt-up or matrix panels 88 are raised, they could optionally be locked together at each corner to improve their watertight connection.

FIG. 29 illustrates the forming of the cavity 89 between a lateral wall 87, the tilt-up matrix panels 88 and the base 86. The cavity 89 has a variable dimension and determines the thickness of the wall to be casted. The form 88 is rotatively attached to the base 86 by hinge 90.

The interior walls 83 may or may not be made of the same material as the exterior walls. Insulation panels 92 made of foam, are inserted within the interior walls 83 to fill up most of the space therein.

FIG. 31 shows an insulation panel 92 having protruding pins 93. Those pins 93 provide a reinforcement to the concrete or gypsum layer that will cover the insulation panels 92. In addition, the pins 93 serve the purpose of centering the panels within the interior walls 83 and providing a space between the interior walls 83 and the panels 92. Such space will be filled with concrete or gypsum to form the skin of the interior walls 83.

FIG. 27 shows that the solid plug 82 is inflated by means of an air-compressor 94, and the insulation panels 92 (not shown) are inserted within the interior walls 83. The next step is the installation of the electrical conduits, mechanical and plumbing against the solid plug 82, as needed.

The electrical, mechanical and plumbing conduits are installed atop the upper lid 85 and within the cavity 89 as desired. Blockouts 99 are also placed atop the upper lid 85 to allow for future installation of sanitary piping, elevators or stairs. (FIG. 27).

Blockouts 102 are also installed against the lateral walls 87 to allow for window and door apertures. These blockouts 102 may in fact be the actual frames of the window and doors to be molded in place.

Lifting rings 101 are also installed on the upper lid 85 and at various locations of the structure to enable the lifting of the finished structure or module.

FIG. 29 shows a partial cross section of a raised tilt-up matrix panel 88. It should be noted that the lateral walls 87 and interior walls 83 are higher than the upper lid 85, so as to entrap a certain thickness of concrete on top of the upper lid 85.

The coating process begins by deciding the floor texture and color. If the floor is to be textured, a textural layer 95 will be laid atop the upper lid 85 or the upper lid 85 may have a permanent texture. If the floor is to be colored, the upper lid 85 or textured layer 95 is sprayed with a coloring layer 96. The coloring material will not overflow through the cavity 89 because as described above, the internal and lateral walls 83 and 87 are slightly higher than the upper lid 85.

Once the colored layer 96 is set, a hardenable material such as a cementitious slurry is poured on top of it. Once the slurry level reaches the height of the lateral walls 87, it will start pouring into the cavity 89, thereby forming the interior walls 83 and the lateral walls 87 or, conversely the slurry may be pumped into the lower cavity or 89, filling until it overflows the upper lid 85.

FIGS. 29 and 32 illustrate the tilt-up matrix 88 as having an L-shaped flange 97 protruding away from the solid plug 82. This flange 97 is to provide a reinforcing beam or ledge 98 along the length of the module as shown in FIG. 27.

When the plug 82 is deflated, the upper lid 85 tends to cave in, due to the effect of gravity, and would only be supported by the flexible joints or membranes 84 (FIG. 28). To avoid the fatigue and stress of the flexible membranes 84, a steel framework 91 is provided within the structure (FIG. 27), to support the upper lid 85 when the plug 82 is deflated or depressurized. For this purpose, the supporting framework 91 is about 2.5 or 5 centimeters (1 or 2 inches) below the height of the upper lid 85.

When the plug 82 is depressurized, the interior and lateral walls 83 and 87 tend to separate from or peel off the solid concrete structure. The depressurization alone may not however, be sufficient to provide a complete separation. Wherefore, there is a need for an air nozzle network 100 as shown in FIG. 27, to cause separation.

This air nozzle network 100 is operated by the same air compressor 94 that inflates the solid plug 82. The air nozzle network 100 is located within the plug 82, and is so designed as to provide a uniform distribution or air bursts or pressure, between the lateral and internal walls 87 and 83 and the cured concrete or gypsum walls. Once the cement slurry is cured, the tilt-up matrix 88 tilted away, and the solid plug 82 depressurized and separated from the cementitious structure or module, the module is lifted away and rotated rightside up by means of the lifting rings 101.

A conventional pre-casted roof is then placed, installed or lowered atop the module.

This manufacturing process enables the stacking of several modules, to form a multi-story building, wherein the floor of the upper module operates as the ceiling of the lower module.

An improved option to the present process comprises a flexible rearrangement of the interior floor plan. Such an improvement is achieved by providing slidable inserts to blockout an interior wall forming area 83 or to allow for the addition of new partitions.

In the above description, the module is basically made out of cement. If on the other hand, additional gypsum, structural or insulation layers need to be added, these layers could be easily placed or installed without any substantial change to the solid plug 82 or the matrix panels 88.

As described above, FIG. 29 shows a slidable tilt-up form 88. As soon as one layer is installed and cured, the tilt-up panels 88 are moved backward to provide space for pouring the next layer between the tilt-up matrix 88 and the solid plug 82.

Figure 33:
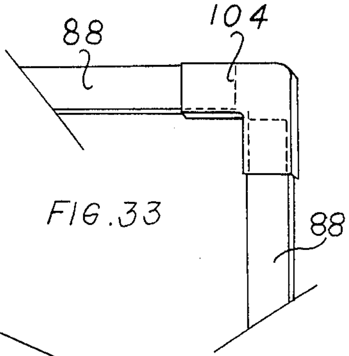
FIG. 33 illustrates the corner extension for the tilt-up panels or walls.

FIG. 33 shows an L-shaped extension 104 which is added to the tilt-up form 88 sections when they travel backward. This extension 104 enables the tilt-up matrix 88 to remain water-tight.

FIG. 32 illustrates a tilt-up wall form 88 which provides for the formation of a beamed vertical wall to create added structural strength as desired. The distribution profile and dimension of the beam cavities 103 may vary with the structural requirements. Reinforcing rebars or steel fiberous mats or posts are laid within the cavities 103 as structurally needed. Additional reinforcing rebar or fibrous mats may be placed atop the lid 85 prior to the pouring process of concrete.

Figure 34:
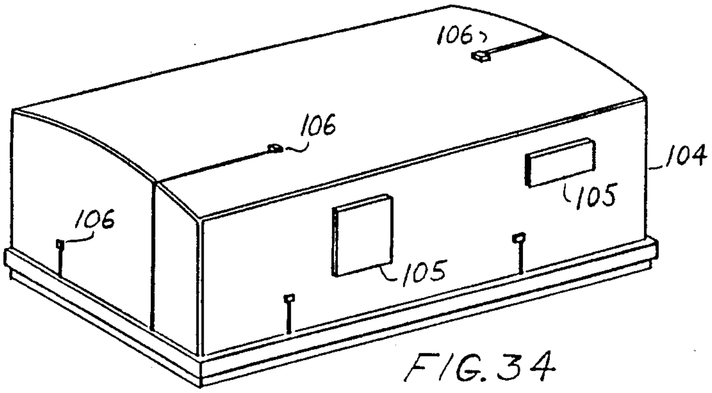
FIG. 34 is a perspective view of the inflatable plug with set-up utilities and blockouts.

Another configuration of the invention is shown in FIG. 34. The inflatable form 104 has been inflated. Window frames 105 and utility conduit/receptacle 106 have been temporarily attached to the inflated form 104. The interior form is now set up for molding.

Figure 35:
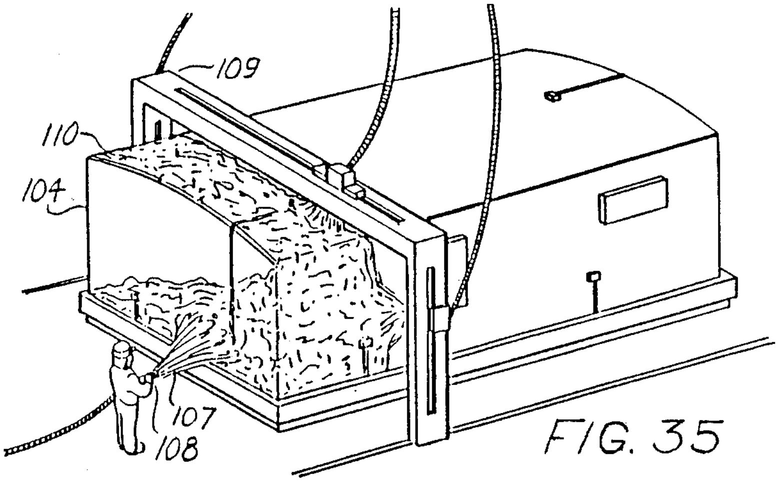

FIG. 35 shows moldable gypsum 107 being sprayed on the inflated form. This can be accomplished by handheld 108 or mechanized spray devices 109. The spray devices form a gypsum membrane 110 on the inflated form after drying.

Figure 36:
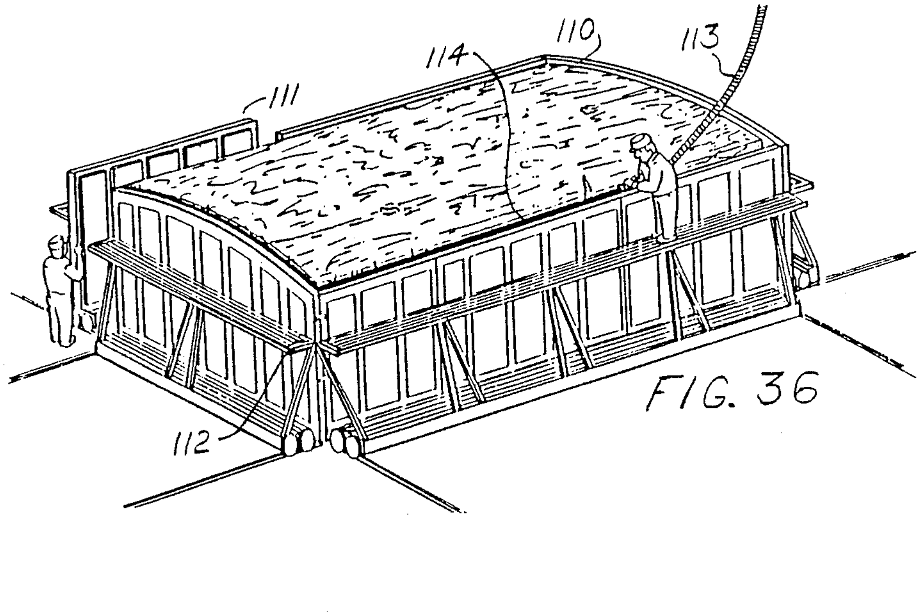
FIG. 36 is a perspective view showing the positioning of outer mold walls around the gypsum sprayed membrane and the injection of casting reinforcement material.

FIG. 36 shows the positioning of outer mold walls 111 around the gypsum sprayed membranes 110 which covers the inflated form 104 (not shown). Outer mold walls are attached to one another with clamps 112 to seal edges which are designed to fit and seal against one another. After sealing, a reinforcement material, such as steel fiber is transported by a conveyor hose 113 to fill the void between the gypsum membrane and outer mold walls. The reinforcing steel fiber fill 114 forms a loose patchwork of steel fibers between the outer mold walls 111 and gypsum membrane 110. Additional fill may also be distributed on the top of the inflated mold.

Figure 37:
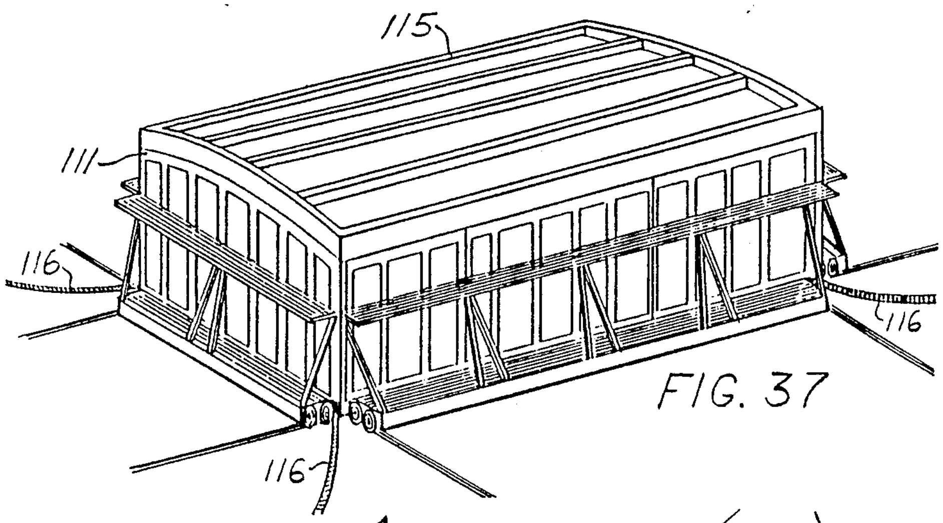
FIG. 37 is a perspective view of the roof form in position during injection of cementitious slurry.

FIG. 37 shows the positioning of a roof form 115 over the gypsum membrane (not shown) and sealing outer mold walls 111. The roof form 115 is designed to fit and seal the tops of outer mold walls 111, forming a cavity between roof form and gypsum membrane.

A cementitious slurry is injected into the reinforcement filled cavity between the outer mold walls 111, roof form 115 and gypsum membrane (not shown) via ducts 116 at three corners of the outer mold walls. A vent (not shown) is provided at the top of the fourth corner. Cementitious slurry is cured or dried by application of heat and/or with time, forming an interior building shell.

Figure 38:
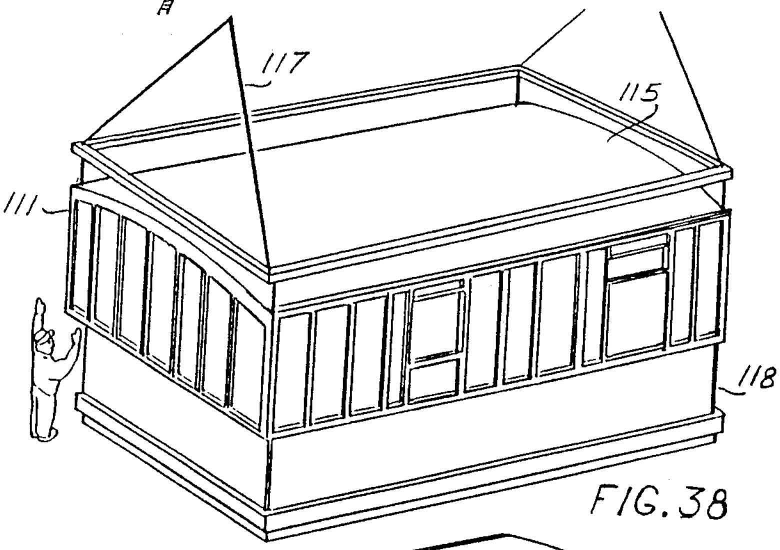
FIG. 38 is a perspective view of the cast shell during removal of forms.

FIG. 38 shows the outer mold walls 111 and roof form 115 being removed by hoist cables 117 exposing interior building shell 118. Not shown is the inflated form 104 which is now collapsed to be reused.

Figure 39:
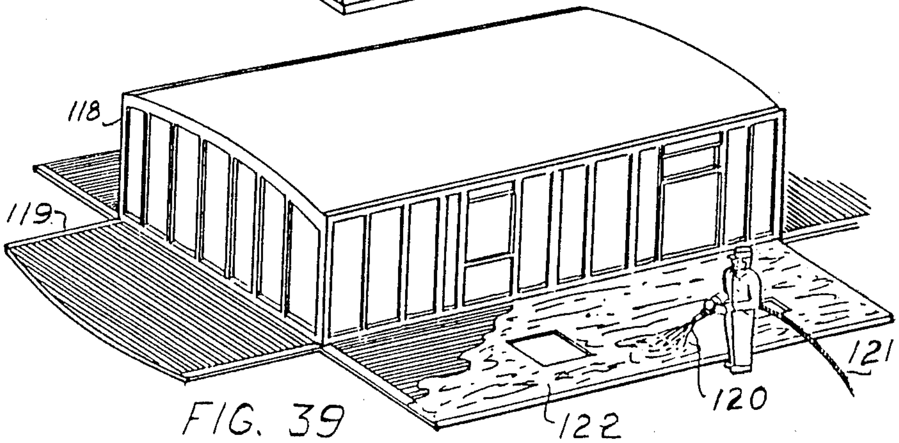
FIG. 39 is a perspective view showing the positioning of outside forming walls during form filling.

FIG. 39 shows the interior building shell 118 in position adjacent to outside forming walls 119. Outside forming walls 119 are being sprayed with stucco slurry 120 by stucco slurry feed system 121. The slurry will harden to form a stucco membrane 122 on the interior of the outside forming walls 119.

Figure 40:
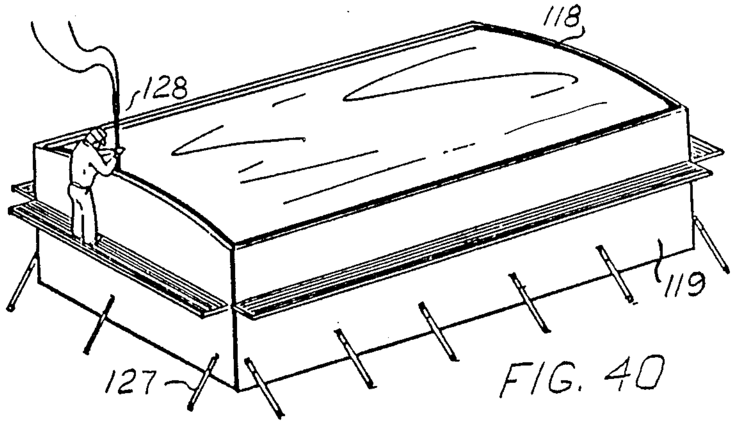
FIG. 40 is a perspective view of outside forming walls during injection of insulation.

FIG. 40 shows the outside forming walls 119 tilted up and held in position with braces 127. The space between the interior building shell and the tilted up walls 119 is measured for insulation. Adjoining wall sections are designed to seal against one another. Mold liner can also be sprayed onto walls 119 and shell 118 to improve adhesion.

Insulation, such as foamed in place polyurethane is injected into the cavity between the outside forming walls 119 (with stucco membrane not shown) and interior shell 118 by insulation injector 128. Outside forming walls 119 can also be sprayed with stucco or simulated wood, stone, brick or other finish (not shown). The foam insulation performs a double purpose (1) holding the exterior walls to the interior shell; and (2) providing thermal insulation. If necessary, interior or exterior surfaces can now be cleaned (not shown).

Figure 41:
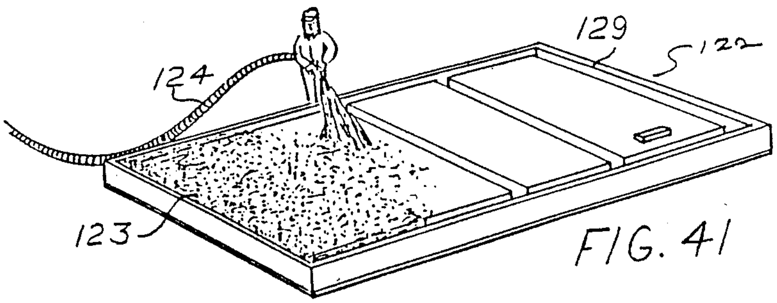
FIG. 41 is a perspective view of floor forms during injection of slurry and reinforcement materials.

FIG. 41 shows a floor form 129 being filled with cementitious slurry 123 by an injection hose 124. Reinforcing fibers, such as steel fibers can be included and augmented by rebar (not shown) if necessary.

Figure 42:
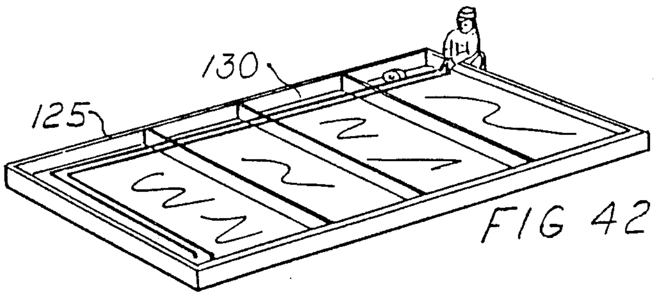
FIG. 42 is a perspective view of cast floor during installation of utilities and conduits.

FIG. 42 shows the cast floor 125 after removal from form (not shown). The floor 125 has been inverted and utilities 126 are being installed.

Figure 43:
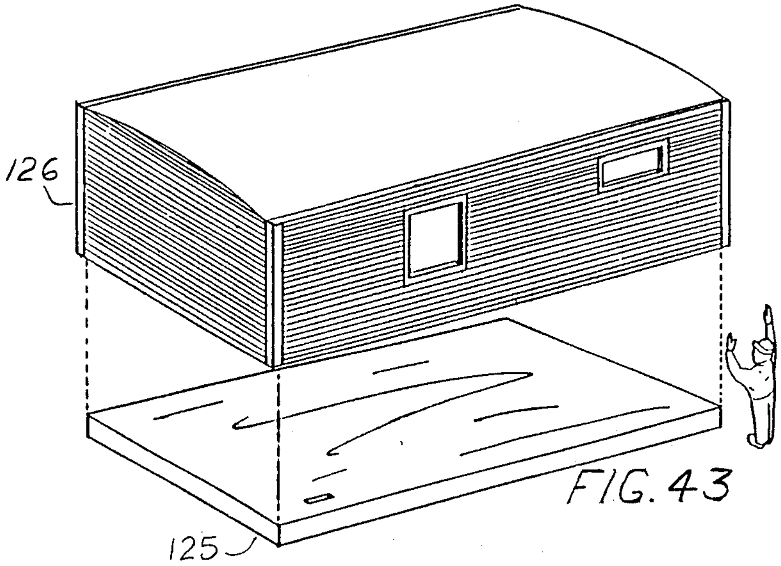
FIG. 43 is a perspective view of shell being joined with cast floor.

FIG. 43 shows the cast floor 125 returned to its normal position and the completed building shell 130 being lowered into position. Floor and shell are held in place by bolting or adhesives (not shown). Final interior trim, exterior trim and painting are now accomplished (not shown). Traditional roofing, windows, doors or other "dry" assembly can also be added, if desired.

The overall process and use of standardized components, dimensions and assembly procedures utilize very few workers. Each semi-skilled worker performs a well-defined task at a given work station. Most operations require two workers for approximately one hour except for the drying phases which are longer but require no labor.

A single production assembly line is estimated to produce up to 1000 units per year or approximately 333 homes. Enclosed, "dry" production space required for up to three assembly lines is 35,000 square feet with each "wet" line requiring 14,000 square feet of open-air space. The interior installation setup and material handling equipment will support up to three "wet" assembly lines for molding the shells. Therefore, the second and third "wet" lines are considerably less expensive to bring on line.

The method described is primarily for shell forming. Once the structural shell or module box is created, interiors are built utilizing existing assembly-line technology similar to what is done for a mobile or modular home. Bathrooms, kitchens, components, walls, fixtures, carpeting and appliances are each installed as needed within the desired module. Since the structural shell requires no internal load supporting walls, an additional benefit is that the interior walls may be modular, movable partition panels or molded gypsum sandwiching a styrofoam core giving thickness and sound deadening.

Assembly of units on site can be accomplished in 4 to 8 hours on a pre-prepared strip or pier foundation depending on the site. Final joint seaming and detailing will require an additional 4 to 8 hours.

While the preferred embodiment of the invention has been described and modifications have been suggested, it should be understood that other embodiments could be devised based on the same principle of operation, which would remain within the spirit of the invention and the scope of the appended claims.

What is claimed is:

1. An assembly-line method for manufacturing a monolithic building structure at a plurality of stations comprising the steps of:
   - inflating an inflatable plug formed by an envelope comprising a plurality of rigid, foldable, panel sections joined by means of hinges;
   - installing blockouts commensurate with desired door and window openings on an outer surface of said plug;
   - applying a layer of gypsum material to said outer surface of said plug;
   - curing said layer of gypsum material;
   - surrounding said plug with a matrix formed by a plurality of movable panels joined together in a parallelly-spaced-apart position from said layer of gypsum material to define a space between said outer surface of said plug and said matrix;
   - covering said gypsum layer with mats of loosely packed filiform reinforcing elements, said mats being dimensioned to fill said space unoccupied by said blockouts between said plug and said matrix;
   - injecting a hardenable cementitious slurry between said plug and matrix and said into said mats;
   - allowing said slurry to cure into a hard shell;
   - separating said matrix panels from said hardened slurry;
   - deflating said plug to separate said rigid sections from said layer of gypsum material; and
   - moving said hard shell to a separate station for further processing.

2. The method of claim 1 which further comprises the step of laying a sole and constructing said hard shell above said sole.

3. The method of claim 2, wherein the step of laying said sole comprises:
   - in a floor pan, having an upwardly convex bottom surface and upright said walls, forming a mat of loosely packed filiform reinforcing elements;
   - filling said pan with a cementitious slurry; and
   - curing said cementitious slurry.

4. The method of claim 2, wherein the step of surrounding said plug with said matrix comprises using a plurality of generally vertical panels having projecting sections extending from the top of said panels toward each other to define a cover over said plug, distally following said outline of the top of said plug.

5. The method of claim 2, which comprises forming said mats by dropping fibers in a container in random orientation; and applying a bonding component to said fibers.

6. The method of claim 2, which further comprises the step of insulating an exterior of said hard shell.

7. The method of claim 6, wherein the step of insulating comprises:
   - coating inside surfaces of a plurality of vertical outer wall forms with an exterior membrane;
   - placing said wall forms parallel to and at a variable distance from said hard shell; and
   - injecting an insulation material between said hard shell and said exterior membrane.

8. The method of claim 1, which further comprises laying hardenable material on top of said inflatable plug to form a floor of said hard shell.

9. The method of claim 8, which further comprises turning said hard shell upside-down.

10. The method of claim 9, which further comprises placing vertical panels between a top and bottom of said plug, said panels being shaped and spaced-apart to define a space for internal partitions.

11. The method of claim 10, wherein the step of injecting hardenable slurry comprises filling said space between said panels.

12. The method of claim 11, which further comprises placing slabs of insulating material between said panels, and injecting a hardenable slurry on either side of each of said slabs.

13. The method of manufacturing a molded building structure comprising the steps of:

inflating a jointed panel, inflatable plug on an assembly floor, said plug having nearly vertical sections and outside dimensions which correspond to the interior dimensions of the desired building structure;

positioning outer mold walls around said vertical sections at a known distance to define a vertically sealed space;

positioning a roof form over an upper part of said outer mold walls at a known distance from the top of said plug to form a sealed cavity in communication with said vertically sealed space;

injecting a hardenable structural material into said sealed cavity between said mold walls, roof form, floor and plug to form an interior building shell;

allowing said structural material to cure;

removing said mold walls and roof form;

deflating and removing said jointed plug;

positioning exterior wall panels around vertical portions of said shell at a known distance to form vertical cavities;

injecting a hardenable insulating material between said wall panels and interior shell to form a building shell; and attaching said building shell to a floor or slab.

14. The method of claim 13 which further comprises the steps of fitting said inflatable plug with blockouts protruding to said outer mold walls to form window and door portals, and temporarily attaching electric outlets and conduits to said plug.

15. The method of claim 14 which further comprises spraying a membrane of gypsum onto the exterior surface of said plug.

16. The method of claim 15, wherein reinforcing fibers are injected into said vertically sealed space between said plug and outer mold walls prior to injecting hardenable structural material.

17. The method of claim 16, wherein said floor is molded in a floor mold by injecting a hardenable structural material into said floor mold.

18. The method of claim 17, wherein said floor mold is filled with reinforcing fibers prior to injecting said hardenable material.

19. The method of claim 18, wherein interior and exterior trim and painting are applied to said building shell.

* * * * *